United States Patent [19]

Sakurai et al.

[11] Patent Number: 5,327,052

[45] Date of Patent: Jul. 5, 1994

[54] METHOD AND APPARATUS FOR CONTROLLING BRUSHLESS DC MOTOR

[75] Inventors: Tetsuji Sakurai; Hideo Masaki; Katsuhiko Kaida; Takahiro Koyanagi, all of Tokyo, Japan

[73] Assignee: Kabushiki Kaisha Toshiba, Kawasaki, Japan

[21] Appl. No.: 857,963

[22] Filed: Mar. 26, 1992

[30] Foreign Application Priority Data

Mar. 29, 1991 [JP] Japan .................. 3-091671

[51] Int. Cl.5 ........................ H02P 6/02; H02P 1/18
[52] U.S. Cl. ..................... 318/254; 318/431
[58] Field of Search ............ 318/138, 254, 430, 431, 318/439

[56] References Cited

U.S. PATENT DOCUMENTS

| 3,609,493 | 9/1971 | Rakes ................. 318/439 |
| 3,780,363 | 12/1973 | Doemen et al. ........... 318/254 |
| 4,114,073 | 9/1978 | Uzuka ................. 318/138 |
| 4,403,177 | 9/1983 | Weber et al. ........... 318/254 |
| 4,544,868 | 10/1985 | Murty ................. 318/254 |
| 4,678,971 | 7/1987 | Lehnhoff et al. ........ 318/254 |
| 4,879,498 | 11/1989 | Shinohara et al. ....... 318/254 |

Primary Examiner—Bentsu Ro
Attorney, Agent, or Firm—Finnegan, Henderson, Farabow, Garrett & Dunner

[57] ABSTRACT

When a brushless DC (direct current) motor is started to rotate a rotor, a normal current value is set and then a motor drive current corresponding to the set normal current value is supplied to the brushless DC motor. If the brushless DC motor is not started by this motor drive current, the current value to be set is increased at a desired rate, and a motor drive current corresponding to the increased current value is supplied to the brushless DC motor. That is, the motor drive current corresponding to the current value increased at a desired rate is sequentially supplied to the brushless DC motor until the brushless DC motor has started.

5 Claims, 5 Drawing Sheets

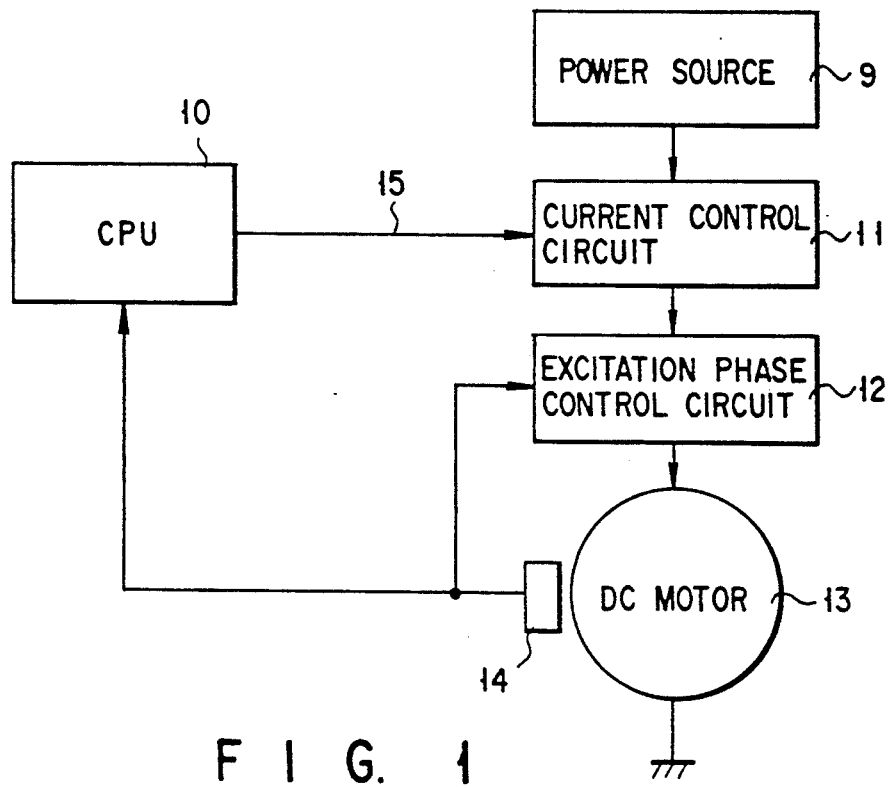
F I G. 1
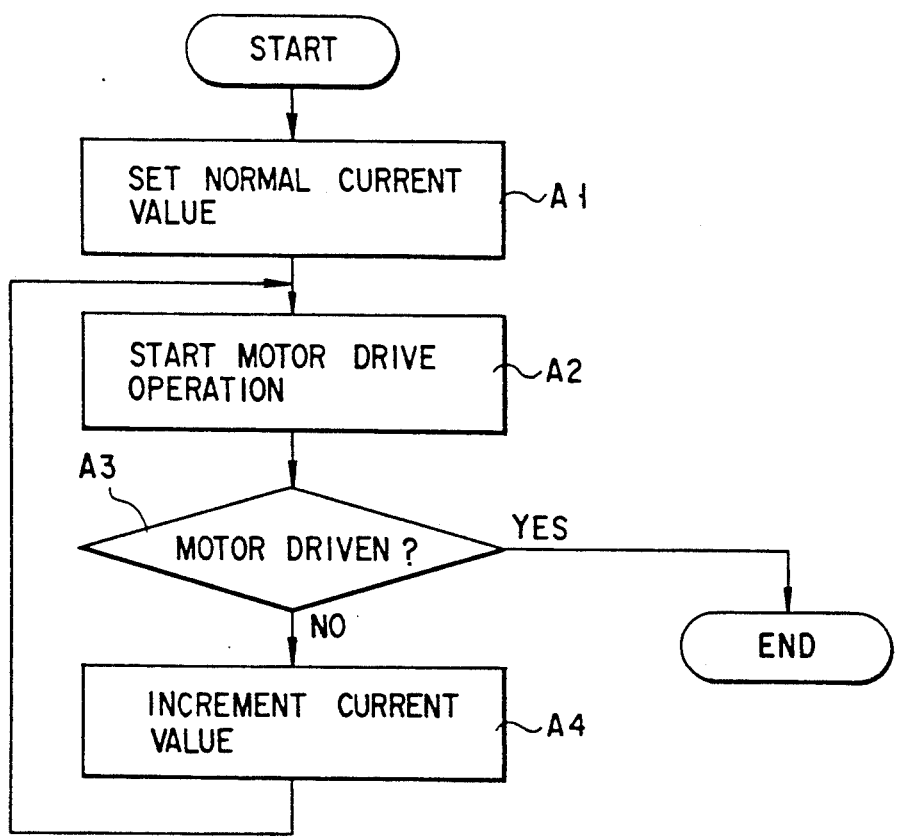
F I G. 2

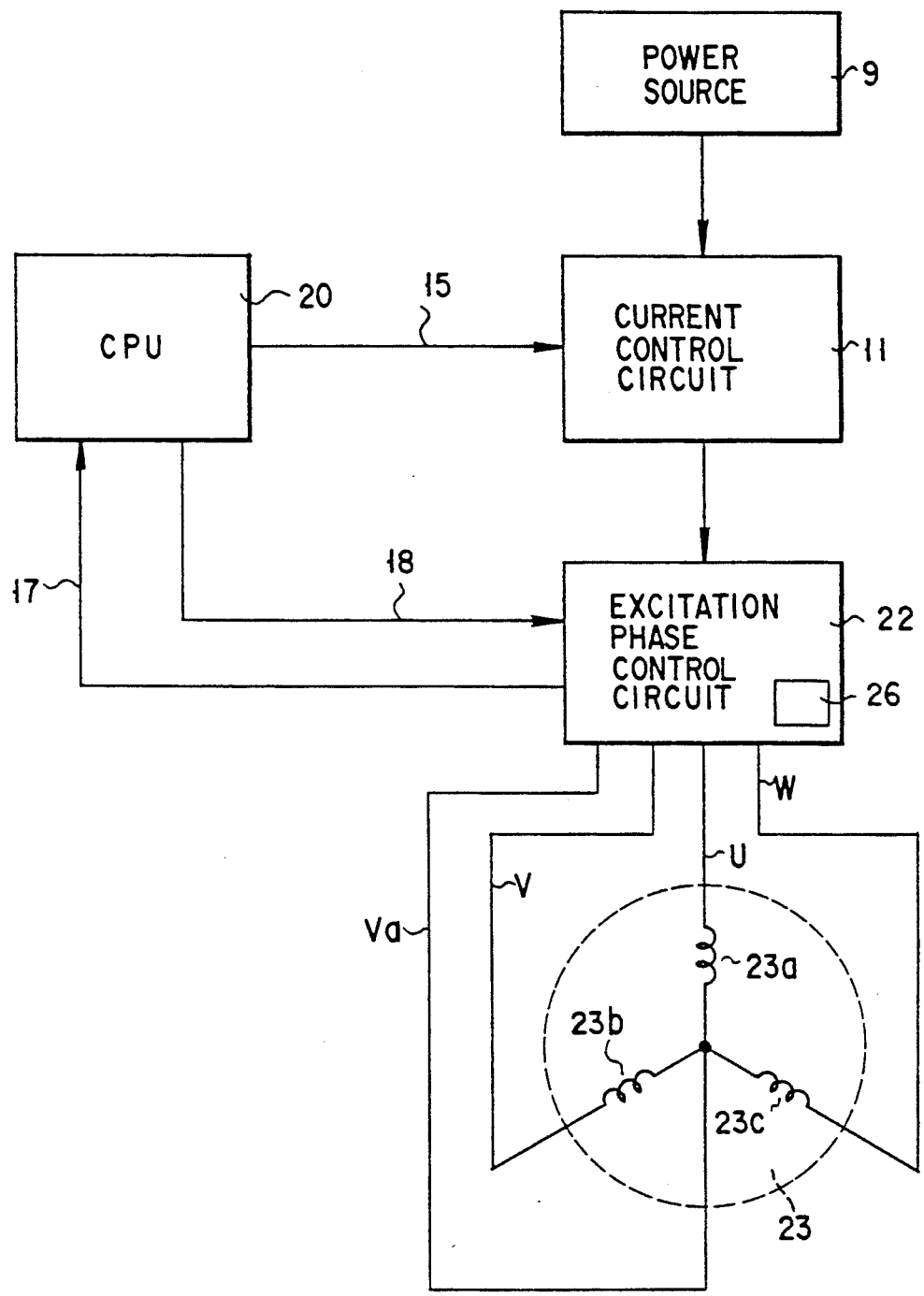
F I G. 5

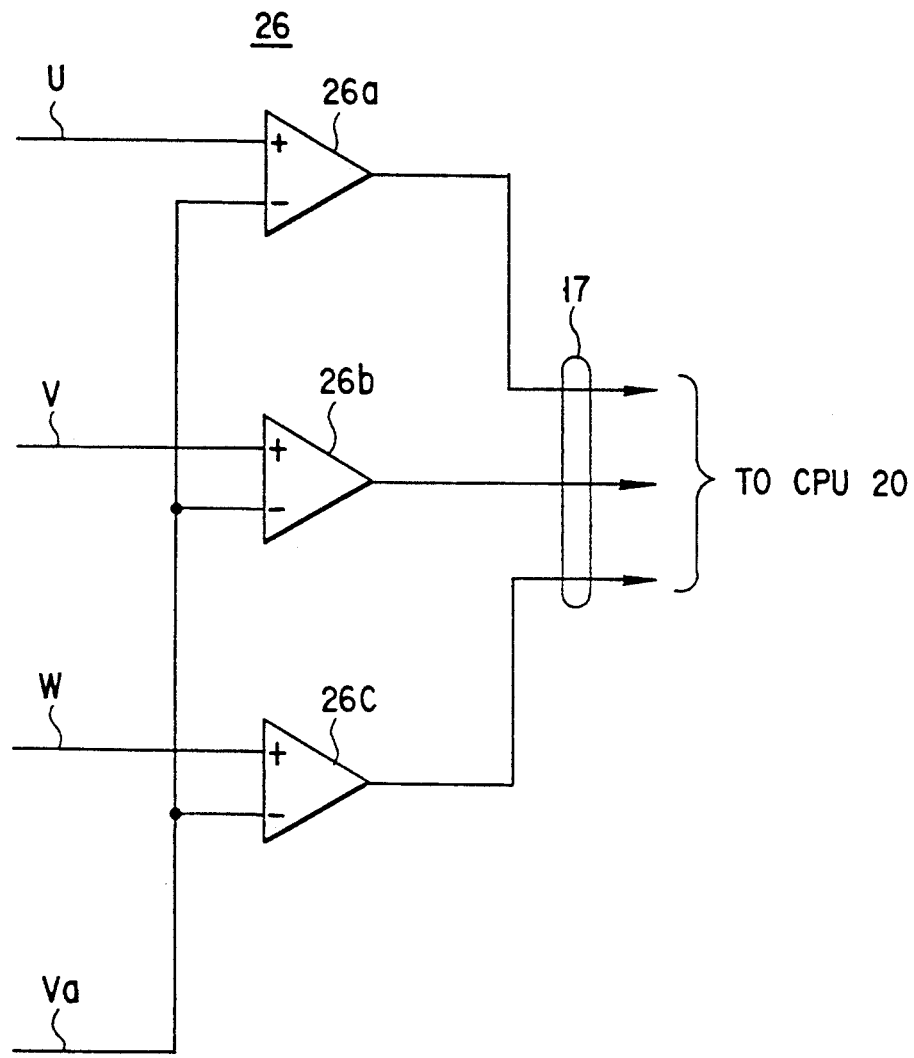
F I G. 6

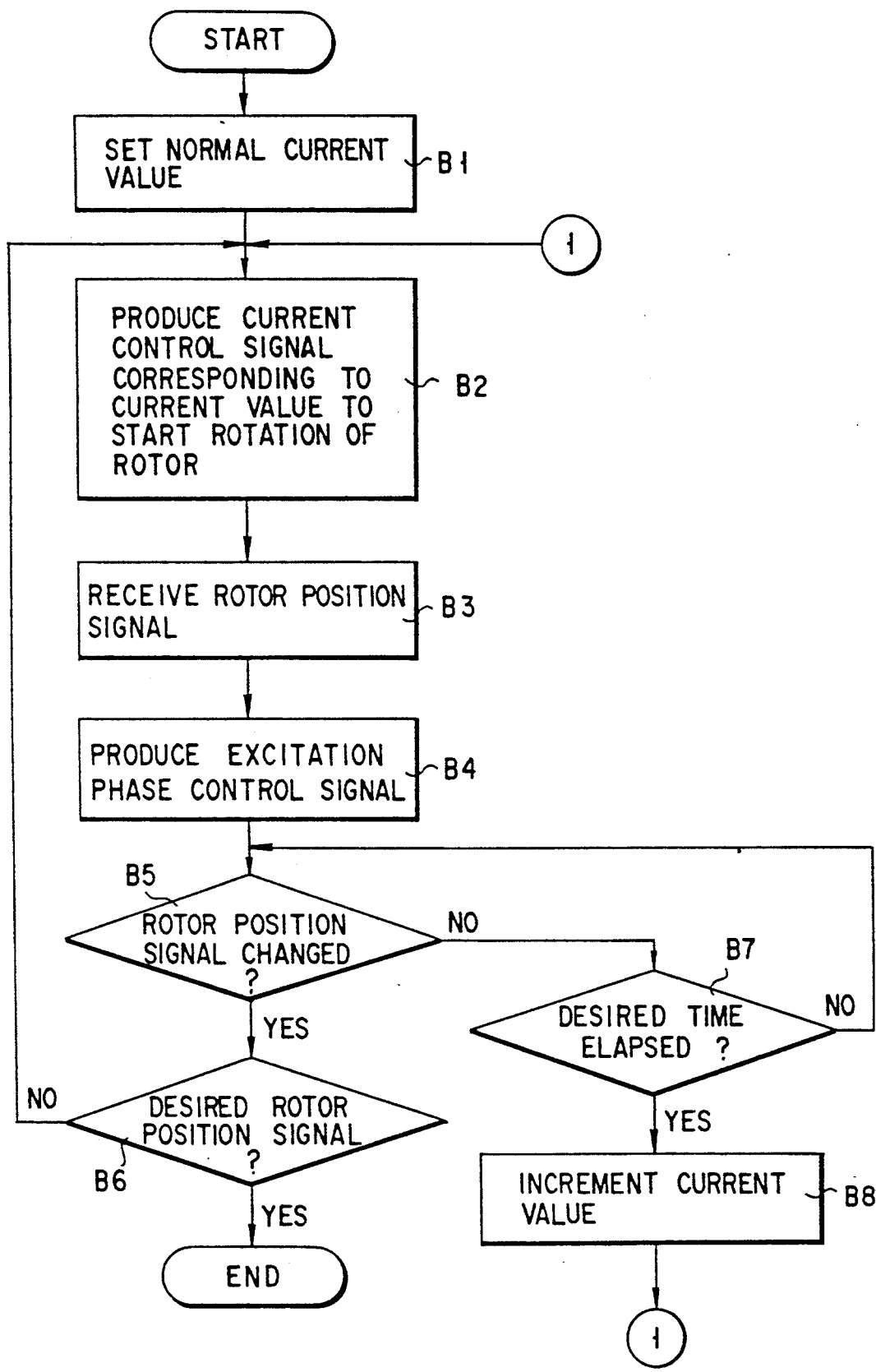
F I G. 7

METHOD AND APPARATUS FOR CONTROLLING BRUSHLESS DC MOTOR

BACKGROUND OF THE INVENTION

1. Field of the Invention

The present invention relates to a method and an apparatus for controlling a brushless DC motor used in a magnetic disk apparatus and the like.

2. Description of the Related Art

In a conventional magnetic disk apparatus, a brushless DC (direct current) motor such as a spindle motor is used to rotate a recording medium (disk), and the brushless DC motor has to be reliably started (driven) in order to use the magnetic disk apparatus. In a conventional brushless DC motor control apparatus, therefore, a value of current supplied to the brushless DC motor is preset in view of various situations, and a drive current corresponding to the current value is supplied to the brushless DC motor when the brushless DC motor is started.

Since the current value is set in view of various situations, the brushless DC motor can reliably be started, irrespective of the situations. In a normal starting operation, however, a drive current to the brushless DC motor overflows.

Battery-driven magnetic disk apparatuses have recently been employed. To save power in these apparatuses, an unnecessary current has to be prevented from flowing to a brushless DC motor. When a magnetic disk apparatus is incorporated into a power-save type computer system, an unnecessary current increases in accordance with an increase in the number of start/stop operations of a brushless DC motor.

It is thus desired to realize a brushless DC motor control apparatus in which a drive current supplied to a brushless DC motor is reduced to reliably start the brushless DC motor.

SUMMARY OF THE INVENTION

It is accordingly an object of the present invention to provide a brushless DC motor control apparatus capable of reducing a drive current supplied to a brushless DC motor to reliably start the brushless DC motor.

According to one aspect of the present invention, there is provided a DC motor control apparatus comprising: a DC motor having a rotor; supply means for supplying a drive current to the DC motor; detection means for detecting a magnetic polar position of the rotor; and control means for determining whether the rotor is rotated in accordance with the magnetic polar position detected by the detection means, and controlling the supply means such that the drive current supplied to the DC motor increases at a predetermined rate until the rotor is rotated.

According to another aspect of the present invention, there is provided a method for controlling a DC motor, comprising the steps of: supplying a drive current to a DC motor having a rotor; detecting a magnetic polar position of the rotor; determining whether the rotor is rotated in accordance with the detected magnetic polar position of the rotor; and increasing the drive current supplied to the DC motor at a predetermined rate when the rotor is not rotated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a constitution of a brushless DC motor control apparatus according to a first embodiment of the present invention;

FIG. 2 is a flowchart of current supply control of the brushless DC motor control apparatus according to the first embodiment performed when a brushless DC motor is started;

FIG. 5 is a block diagram showing a constitution of a brushless and sensorless DC motor control apparatus according to a second embodiment of the present invention;

FIG. 6 is a view showing a constitution of a rotor position detector of an excitation phase control circuit of the brushless and sensorless DC motor control apparatus according to the second embodiment; and FIG. 7 is a flowchart of current supply control of the brushless and sensorless DC motor control apparatus according to the second embodiment performed when a brushless DC motor is started.

DETAILED DESCRIPTION OF THE PREFERRED EMBODIMENTS

Figure 3:
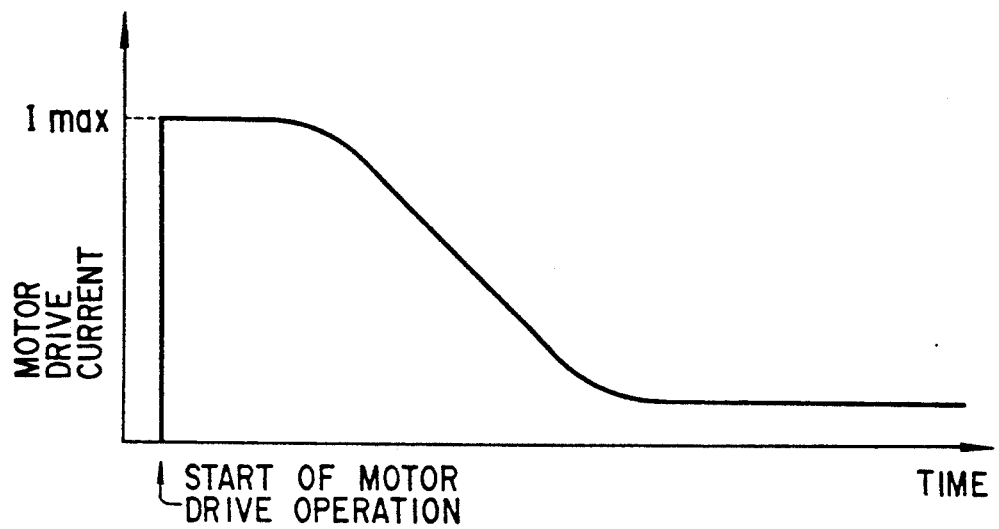
FIG. 3 is a graph showing a variation in motor drive current supplied to a brushless DC motor of a conventional brushless DC motor control apparatus when the brushless DC motor is started.

Embodiments of the present invention will be described with reference to the accompanying drawings.

FIG. 1 is a block diagram showing a constitution of a brushless DC motor control apparatus according to a first embodiment of the present invention. As shown in FIG. 1, the brushless DC motor control apparatus comprises a power source 9, a CPU (central processing unit) 10, a current control circuit 11, an excitation phase control circuit 12, a brushless DC (direct current) motor 13, and a position sensor 14.

The brushless DC motor 13 is, for example, a spindle motor used in a magnetic disk apparatus or the like and includes a stator having a plurality of motor coils and a permanent magnet used as a rotor (not shown, respectively). Each of the motor coils corresponds to an excitation phase. The power source 9 supplies a predetermined current to the current control circuit 11. The current control circuit 11 controls the predetermined current supplied from the power source 9 in response to a current control signal 15 output from the CPU 10, and supplies the controlled current to the excitation phase control circuit 12 as a motor drive current for driving the brushless DC motor 13.

The position sensor 14 includes a hole sensor using a hole element for detecting a magnetic polar position of a rotor of the brushless DC motor 13. The position sensor 14 is arranged in each of the excitation phases (motor coils) of the brushless DC motor 13. A position signal indicative of the polar position detected by the position sensor 14 is supplied to the CPU 10 and excitation phase control circuit 12. If three excitation phases, i.e., three motor coils, are used in the brushless DC motor 13, three position sensors are required.

The excitation phase control circuit 12 performs excitation of the brushless DC motor 13 in response to the position signal supplied from the position sensor 14. When the motor drive current is supplied to the motor coils by the excitation of the brushless DC motor 13, a rotating field is applied to the rotor, and the rotor is rotated accordingly. That is, the brushless DC motor 13 is started (driven).

The CPU 10 supplies the current control signal 15 for controlling the motor drive current supplied to the brushless DC motor 13 to the current control circuit 11 in response to the position signal from the position sensor 14. The CPU 10 determines whether or not the brushless DC motor 13 is started, i.e., whether or not the rotor is rotated, based on the position signal from the position sensor 14 and, when the brushless DC motor is not started (when the rotor is not rotated), controls the current control circuit 11 such that the motor drive current is increased and supplied to the brushless DC motor 13.

Current supply control performed to start (drive) the brushless DC motor in the brushless DC motor control apparatus according to the first embodiment of the present invention, will be described with reference to the accompanying FIGS. 2 to 4.

Figure 4:
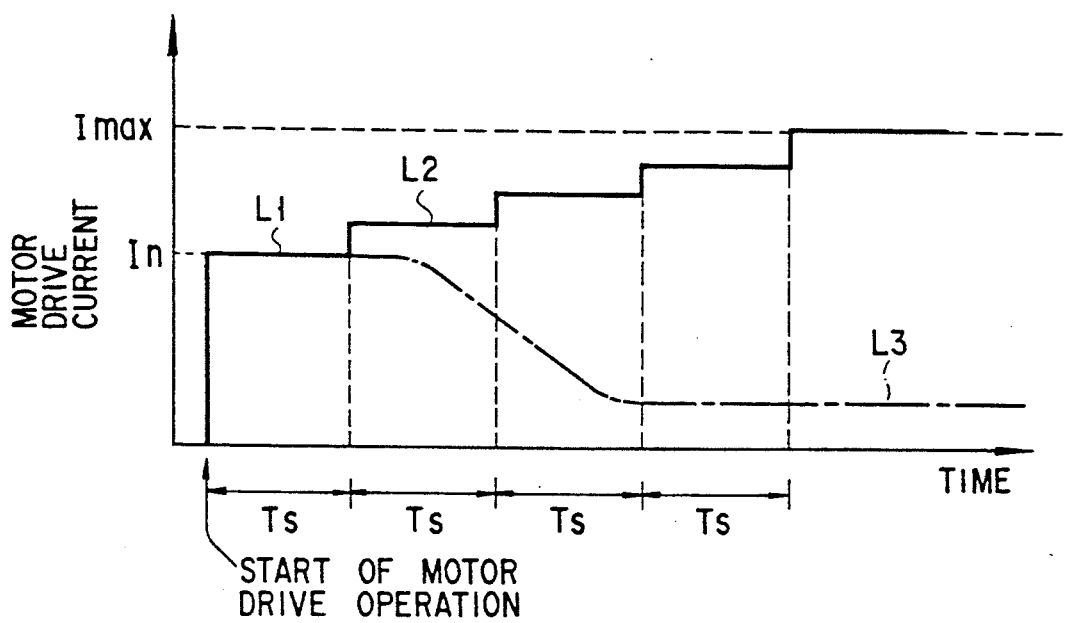
FIG. 4 is a graph showing a variation in motor drive current supplied to the brushless DC motor of the brushless DC motor control apparatus according to the first embodiment when the brushless DC motor is started.

FIG. 2 is a flowchart of the current supply control performed when the brushless DC motor is started in the brushless DC motor control apparatus according to the first embodiment of the present invention, FIG. 3 is a graph showing a variation in motor drive current supplied to a brushless DC motor when the brushless DC motor is started in a conventional brushless DC motor control apparatus, and FIG. 4 is a graph showing a variation in the motor drive current supplied to the brushless DC motor when the brushless DC motor is started in the brushless DC motor control apparatus according to the first embodiment of the present invention. In FIGS. 3 and 4, Imax indicates the maximum current which can be supplied from the current control circuit 11 to the brushless DC motor 13, In denotes a normal current necessary for normally starting the brushless DC motor, and Ts represents a period of time from when a brushless DC motor driving operation is started to when it is determined whether the brushless DC motor has been driven or not. The normal current In varies within a predetermined range and, in the embodiment of the present invention, the upper limit of the predetermined range is set as the normal current In. The maximum current Imax is set in consideration of various situations when the brushless DC motor is started.

Conventionally, as shown in FIG. 3, the maximum current Imax as the motor drive current is supplied to the brushless DC motor 13 when the motor driving operation is started. If the brushless DC motor is started, i.e., if the rotor is rotated, the motor drive current gradually decreases as the rotational speed of the rotor approaches the constant rotational speed. When the rotational speed of the rotor reaches the constant rotational speed, the motor drive current becomes constant.

In the embodiment of the present invention, as shown in FIG. 2, a normal current value of the motor drive current supplied to the brushless DC motor 13 is set by the CPU 10, and the current control signal 15 corresponding to the set normal current value is supplied from the CPU 10 to the current control circuit 11. The current control circuit 11 supplies a motor drive current to the excitation phase control circuit 12 in response to the current control signal 15 (see L1 in FIG. 4).

In step A2, when the motor drive current is supplied from the current control circuit 11, in the excitation phase control circuit 12 the motor driving operation for the brushless DC motor 13 is started in accordance with the position signal from the position sensor 14. In other words, the excitation phases are changed to each other.

In step A3, after the motor driving operation is performed in step A2, the CPU 10 determines whether the rotor has been rotated, that is, whether the brushless DC motor 13 has been started, in accordance with the position signal from the position sensor 14. If it is determined that the brushless DC motor 13 has been started in step A3, the motor drive current gradually decreases as the rotational speed of the rotor approaches the constant rotational speed and, when the rotational speed reaches the constant rotational speed, the motor drive current becomes constant (see L3 in FIG. 4). Accordingly, since the current value of the motor drive current is smaller than that in the conventional case, power consumption can be reduced.

If it is determined that the brushless DC motor 13 is not started in step A3, a current value to be set is increased by the CPU 10 in step A4. The current control signal 15 indicative of the increased current value is supplied to the current control circuit 11, and the increased motor drive current is supplied from the current control circuit 11 to the excitation phase control circuit 12 in response to the current control signal 15 (see L2 in FIG. 4). Therefore, the motor driving operation for the brushless DC motor is started again in step A2.

The motor drive current increases until the brushless DC motor 13 is started (the rotor is rotated), and the increased motor drive current is supplied to the brushless DC motor 13. As described above, the motor drive current can be increased to the maximum current Imax. Thus the brushless DC motor can reliably be started.

In the first embodiment, the brushless DC motor having position sensor 14 was described; however, the present invention can be applied to a brushless and sensorless DC motor.

FIG. 5 is a block diagram showing a constitution of a brushless and sensorless DC motor control apparatus according to a second embodiment of the present invention. As shown in FIG. 5, the brushless and sensorless DC motor control apparatus comprises a power source 9, a current control circuit 11, a CPU 20, an excitation phase control circuit 22, and a brushless and sensorless DC motor 23. The power source 9 and current control circuit 11 each have the same structure as in the apparatus of the first embodiment.

The brushless and sensorless DC motor 23 includes, for example, three motor coils 23a, 23b, and 23c (U-, V-, and W-phases) and a rotor (not shown). The motor coils 23a, 23b, and 23c generate a magnetic field by a motor drive signal corresponding to a motor drive current supplied from the excitation phase control circuit 22, thereby to rotate the rotor.

If the rotor is rotated, back electromotive forces are generated on the motor coils 23a, 23b, and 23c. These back electromotive forces are superimposed on the motor drive signal, and the superimposed signal is supplied to the excitation phase control circuit 22. A common voltage Va in the motor coils 23a, 23b, and 23c is also supplied to the excitation phase control circuit 22.

The excitation phase control circuit 22 includes a rotor position detector 26 for detecting a magnetic polar position of the rotor of the brushless and sensorless DC motor 23. As shown in FIG. 6, the rotor position detector 26 includes comparators 26a, 26b, and 26c. These comparators 26a, 26b, and 26c compare the common voltage Va with the back electromotive forces of the motor coils 23a, 23b, and 23c, and supply a result of the comparison to the CPU 20 as a rotor position signal 17.

The CPU 20 determines the magnetic polar position of the rotor based on the rotor position signal 17 output from the rotor position detector 26 and supplies an excitation phase control signal 18 to the excitation phase control circuit 22 based on a result of the determination. The excitation phase control circuit 22 outputs a motor drive signal for exciting the motor coils 23a, 23b, and 23c in response to the excitation phase control signal 18 from the CPU 20.

The current supply control performed when a brushless and sensorless DC motor is started in a brushless and sensorless DC motor control apparatus according to a second embodiment of the present invention, will be described with reference to the flowchart shown in FIG. 7.

In step B1, a normal current value of motor drive current supplied to the brushless and sensorless DC motor 23 is set by the CPU 20.

In step B2, the current control signal 15 corresponding to the set normal current value is supplied from the CPU 20 to the current control circuit 11. In the current control circuit 11, the current is supplied from the power source 9 to the excitation phase control circuit 22 as a motor drive current in response to the current control signal 15 output from the CPU 20. The CPU 20 supplies the excitation phase control signal 18 to the excitation phase control circuit 22. In the excitation phase control circuit 22, the motor drive current from the current control circuit 11 is supplied to the motor coils 23a, 23b, and 23c in response to the excitation phase control signal 18. Since the magnetic polar position of the rotor cannot be detected by the brushless and sensorless DC motor 23 before the motor 23 is started, a motor drive current for exciting two of three phases of the sensorless brushless DC motor 23, for example, the motor coils 23b and 23a of V and U phases, is supplied, thereby starting rotation of the rotor.

If the rotor starts to rotate, the rotor position signal 17 representing the magnetic polar position of the rotor is supplied from the rotor position detector 26 to the CPU 20. If the CPU 20 receives the rotor position signal 17 (step B3), the excitation phase control signal 18 for exciting the motor coils 23b and 23c of V and W phases, for example, is supplied from the CPU 20 to the excitation phase control circuit 22 in response to the rotor position signal (step B4). In the excitation phase control circuit 22, the motor drive current is supplied to the motor coils 23b and 23c in response to the excitation phase control signal 18 from the CPU 20.

In step B5, the CPU 20 determines whether the rotor position signal 17 supplied from the rotor position detector 26 is changed or not. If the rotor position signal 17 is changed, it is determined whether the changed rotor position signal 17 is a desired rotor position signal or not in step B6. In other words, it is determined whether the rotor position signal 17 is a rotor position signal of the motor coils 23b and 23c of V and W phases.

If it is determined in step B6 that the rotor position signal 17 is not a rotor position signal of V and W phases, the processing in step B2 and its following steps is repeated.

If it is determined in step B5 that the rotor position signal 17 does not change, the CPU 20 determines whether a desired time period elapses in step B7. If it is determined in step B7 that the desired time period does not elapse, the processing in step B5 is repeated. It is thus checked whether the rotor position signal 17 is changed or not within the desired time period by the processing in steps B5 and B7.

In step B7, when the desired time period elapses, that is, when the rotor position signal 17 does not change within a desired time period it is determined that the brushless and sensorless DC motor 23 is not started, and the current value set by the CPU 20 is increased (step B8). The processing in step B2 and its following steps is then repeated.

The motor drive current is sequentially increased until the brushless and sensorless DC motor 23 is started, and the increased motor drive current is supplied to the sensorless brushless DC motor 23. Like in the first embodiment, the motor drive current can be increased to the maximum current Imax, thereby reliably starting the brushless and sensorless DC motor.

As described above, in the present invention, the drive current for starting (driving) the brushless DC motor, i.e., the drive current for rotating the rotor, is supplied with a gradual increase, resulting in that the brushless DC motor can efficiently be started, and the power consumption of the brushless DC motor can be reduced. The rate at which a motor drive current increases can be set in accordance with various types of apparatuses incorporating a brushless DC motor.

The present invention can be applied to a power-save type apparatus incorporating a brushless DC motor, for example, a battery-driven magnetic disk apparatus. In a battery-driven magnetic disk apparatus using a CSS (contact start and stop) method, when the apparatus is powered off, a magnetic head is placed in contact with a CSS zone of a recording medium. When the apparatus is powered on and the recording medium is rotated, the magnetic head is flown from the recording medium. In other words, since the magnetic head is placed in contact with the recording medium every time the apparatus is powered off, the coefficient of friction between the recording medium and the magnetic head is increased, together with an increase in frequency of use of the apparatus. For example, the coefficient of friction is about 0.10 to 0.12 when the apparatus is shipped; however, it increases up to about 0.15 to 0.16 and about 0.25 to 0.26 as the apparatus is used If the coefficient of friction is increased, the current value corresponding to the motor drive current has to be increased to start the brushless DC motor.

In the conventional apparatus, the maximum current (see FIG. 3) is supplied to the brushless DC motor as motor drive current when the brushless DC motor is started. Therefore, when the coefficient of friction between a recording medium and a magnetic head is low, a drive current to the brushless D motor overflows, thereby preventing power saving.

In the present invention, however, the normal current, which is less than the maximum current, is supplied to the brushless DC motor, as a motor drive current. When the brushless DC motor is not started by the normal current, the increased motor drive current is supplied to the brushless DC motor (see FIG. 4). Since the motor drive current increases as the coefficient of friction between the recording medium and the magnetic head increases, the drive current can efficiently be supplied; therefore, power saving can be achieved.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A DC motor control apparatus comprising:
   a DC motor having a rotor;
   supply means for supplying a drive current to the DC motor;
   detection means for detecting a magnetic polar position of the rotor;
   determination means for determining whether the rotor is rotated in accordance with the magnetic polar position detected by the detection means; and
   control means for controlling the supply means to supply a predetermined value of the drive current to the DC motor when the DC motor is started, and, when the determination means indicates that the rotor is not rotated, for controlling the supply means to increase the value of the drive current supplied to the DC motor at a predetermined rate until the rotor is rotated,
   wherein the DC motor includes a plurality of coils, and the detection means detects the magnetic polar position of the rotor based on back electromotive forces generated on the plurality of coils by the drive current supplied to the plurality of coils by the supply means.

2. A method for controlling a DC motor, comprising the steps of:
   supplying a predetermined value of drive current to the DC motor when the DC motor is started, the DC motor having a rotor;
   detecting a magnetic polar position of the rotor;
   determining whether the rotor is rotated in accordance with the detected magnetic polar position of the rotor; and
   when the determining step indicates that the rotor is not rotated, increasing the value of the drive current supplied to the DC motor at a predetermined rate until the rotor is rotated,
   wherein the DC motor includes a plurality of coils, and the step of detecting the magnetic polar position of the rotor includes the step of detecting back electromotive forces generated on the plurality of coils by supplying the drive current to the plurality of coils.

3. A DC motor control apparatus comprising:
   a DC motor having a rotor;
   supply means for supplying a drive current to the DC motor;
   detection means for detecting a magnetic polar position of the rotor;
   determination means for determining whether the rotor is rotated in accordance with the magnetic polar position detected by the detection means; and
   control means for controlling the supply means to supply a predetermined value of the drive current necessary to start the DC motor when the DC motor is started, and, when the determination means indicates that the rotor is not rotated, for controlling the supply means to increase the value of the drive current supplied to the DC motor at a predetermined rate,
   wherein the DC motor includes a plurality of coils, and the detection means detects the magnetic polar position of the rotor based on back electromotive forces generated on the plurality of coils by the drive current supplied to the plurality of coils by the supply means.

4. A DC motor control apparatus comprising:
   a DC motor having a rotor and a plurality of coils;
   supply means for supplying a drive current to the DC motor;
   detection means for detecting a magnetic polar position of the rotor based on back electromotive forces generated on the plurality of coils by the drive current supplied to the plurality of coils by the supply means;
   determination means for determining whether the rotor is rotated in accordance with the magnetic polar position detected by the detection means; and
   control means for controlling the supply means to supply a predetermined value of the drive current to the DC motor when the DC motor is started, and, when the determination means indicates that the rotor is not rotated, for controlling the supply means to increase the value of the drive current supplied to the DC motor at a predetermined rate until the rotor is rotated.

5. A method for controlling a DC motor, comprising the steps of:
   supplying a predetermined value of drive current to a DC motor having a rotor and a plurality of coils when the DC motor is started;
   detecting a magnetic polar position of the rotor based on back electromotive forces generated on the plurality of coils by the drive current supplied to the plurality of coils;
   determining whether the rotor is rotated in accordance with the detected magnetic polar position of the rotor; and
   when the determining step indicates that the motor is not rotated, increasing the drive current supplied to the DC motor at a predetermined rate until the rotor is rotated.

* * * * *